United States Patent
Liu

(10) Patent No.: US 11,233,752 B2
(45) Date of Patent: Jan. 25, 2022

(54) PACKET FORWARDING

(71) Applicant: NEW H3C TECHNOLOGIES CO., LTD, Zhejiang (CN)

(72) Inventor: Jiajia Liu, Beijing (CN)

(73) Assignee: NEW H3C TECHNOLOGIES CO., LTD, Hangzhou (CN)

( * ) Notice: Subject to any disclaimer, the term of this patent is extended or adjusted under 35 U.S.C. 154(b) by 37 days.

(21) Appl. No.: 16/066,808

(22) PCT Filed: Dec. 29, 2016

(86) PCT No.: PCT/CN2016/112878
§ 371 (c)(1),
(2) Date: Jun. 28, 2018

(87) PCT Pub. No.: WO2017/114447
PCT Pub. Date: Jul. 6, 2017

(65) Prior Publication Data
US 2019/0020601 A1    Jan. 17, 2019

(30) Foreign Application Priority Data
Dec. 30, 2015    (CN) .......................... 201511019401.2

(51) Int. Cl.
*H04L 12/947* (2013.01)
*H04L 12/24* (2006.01)
*H04L 12/715* (2013.01)
*H04L 12/741* (2013.01)

(52) U.S. Cl.
CPC ........ *H04L 49/258* (2013.01); *H04L 41/0803* (2013.01); *H04L 45/64* (2013.01); *H04L 45/745* (2013.01); *H04L 49/25* (2013.01); *H04L 49/252* (2013.01)

(58) Field of Classification Search
CPC ... H04L 49/258; H04L 41/0803; H04L 45/64; H04L 45/745; H04L 49/25; H04L 49/252
See application file for complete search history.

(56) References Cited

U.S. PATENT DOCUMENTS

| 9,356,866 B1 * | 5/2016 | Sivaramakrishnan ....................... H04L 45/586 |
| 2004/0111591 A1 * | 6/2004 | Arimilli .............. G06F 9/30116 712/228 |
| 2006/0209688 A1 | 9/2006 | Tsuge et al. |

(Continued)

FOREIGN PATENT DOCUMENTS

| CN | 103995733 A | 8/2014 |
| CN | 104901898 A | 9/2015 |

(Continued)

OTHER PUBLICATIONS

International Search Report for Application No. PCT/CN2016/112878, dated Mar. 15, 2017, 2 pages.

*Primary Examiner* — Walter J Divito
*Assistant Examiner* — Anthony Luo
(74) *Attorney, Agent, or Firm* — McCarter & English, LLP; Kia L. Freeman; Thomas F. Foley

(57) ABSTRACT

A receiving core reads a packet from an ingress interface, wherein the ingress interface is an interface corresponding to a forwarding group to which the receiving core belongs; the receiving core sends the read packet to a forwarding core in the forwarding group; and the forwarding core sends the packet to a corresponding egress interface.

10 Claims, 3 Drawing Sheets

(56) References Cited

U.S. PATENT DOCUMENTS

| | | | |
|---|---|---|---|
| 2011/0161943 A1 | 6/2011 | Bellows et al. | |
| 2012/0036178 A1* | 2/2012 | Gavini | H04L 67/2804 709/203 |
| 2014/0269685 A1 | 9/2014 | Christenson et al. | |
| 2015/0067229 A1* | 3/2015 | Connor | G06F 13/4022 710/317 |
| 2016/0057066 A1 | 2/2016 | Gasparakis et al. | |

FOREIGN PATENT DOCUMENTS

| | | | |
|---|---|---|---|
| CN | 105159841 A | 12/2015 |
| JP | 2006245841 A | 9/2006 |
| JP | 2010130524 A | 6/2010 |
| JP | 2016046806 A | 4/2016 |

\* cited by examiner

PACKET FORWARDING

CROSS-REFERENCE TO RELATED APPLICATIONS

This application is a 35 U.S.C. § 371 national stage filing of International Application No. PCT/CN2016/112878, filed on Dec. 29, 2016, which claims priority to Chinese Patent Application No. 201511019401.2, filed on Dec. 30, 2015. The entire contents of each of the foregoing applications are incorporated herein by reference.

BACKGROUND

In a Symmetric Multi-Processing (SMP) system, a plurality of cores may conflict with each other when accessing a memory via a shared system bus. Therefore, a Network Function Virtualization (NFV) device which may adopt a Non-Uniform Memory Architecture (NUMA) mode may be proposed. The NFV device adopting the NUMA mode may include a plurality of NUMA nodes, namely NUMA-NODE, wherein each node may be allocated with a storage space, for example, a local memory of the node. Each NUMA node may include a plurality of cores, which may be configured as a control core, a receiving core or a forwarding core. And wherein, forwarding cores may disperse in a plurality of NUMA nodes, and the receiving core may forward a packet to the forwarding core in any NUMA node.

The receiving core may access a local memory of a NUMA node to which the receiving core belongs when receiving a packet. However, when the packet is to be forwarded to a forwarding core in another NUMA node, the forwarding core may read the packet by accessing a non-local memory, for example, by a cross-memory access.

DETAILED DESCRIPTION OF THE EMBODIMENTS

Figure 1:
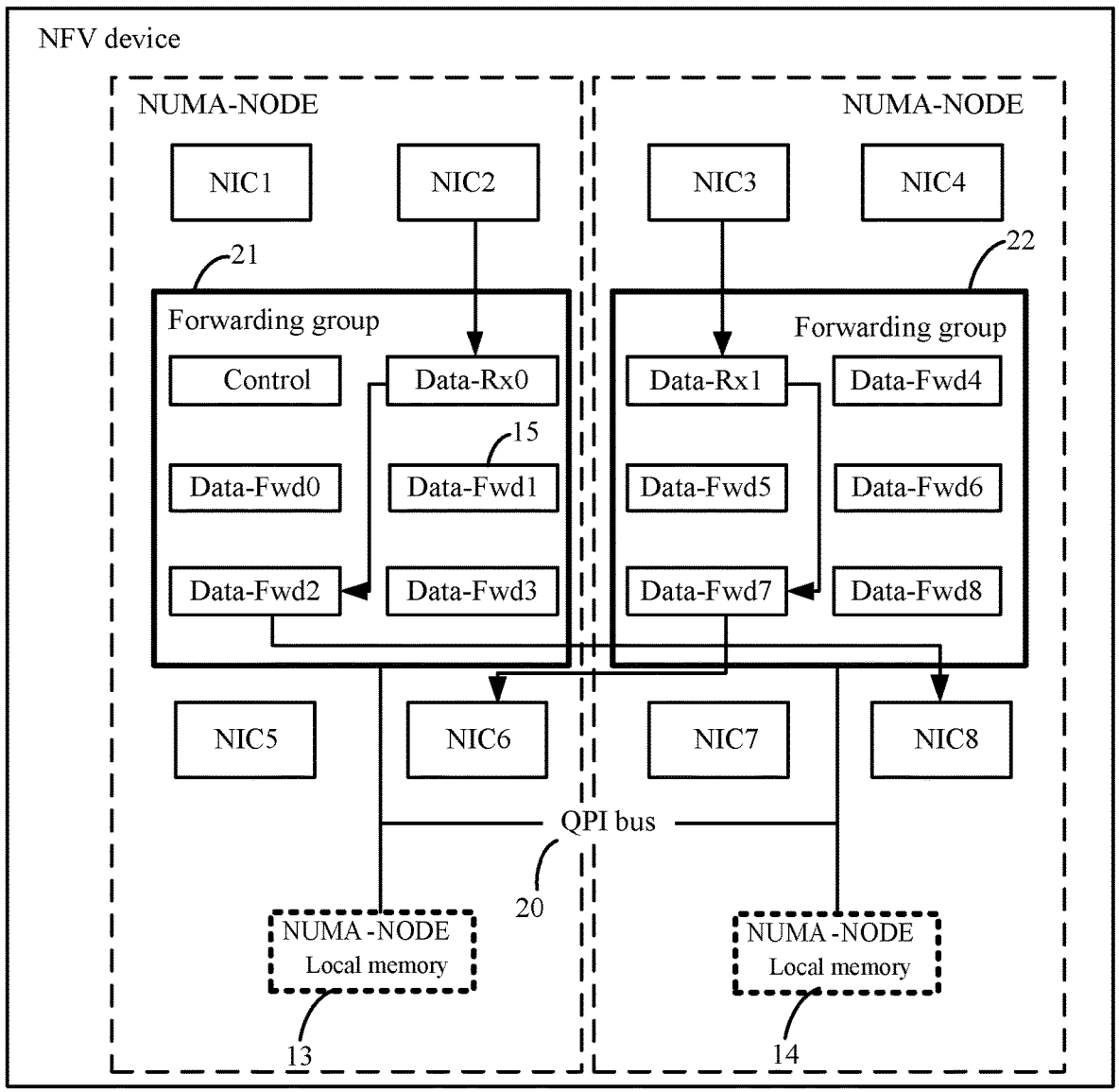
FIG. 1 is a structural schematic diagram of an NFV device according to an example of the present disclosure.

The following may clearly and completely describe the technical solutions in the examples of the present disclosure with reference to the accompanying drawings. Apparently, the examples described are merely some but not all of the examples of the present disclosure. All other examples obtained by persons of ordinary skill in the art based on the examples of the present disclosure without creative efforts shall fall within the protection scope of the present disclosure.

First of all, a NUMA system structure may be simply described. In the NUMA system structure, a plurality of cores may belong to different NUMA nodes. Each NUMA node may have its own local memory.

A plurality of network interface cards (NICs) may be arranged around each NUMA node, and all these NICs may be associated with the NUMA nodes. A packet received by a NIC may be forwarded by a NUMA node associated with the NIC.

As an example, in a NUMA system structure, there are 12 cores which may belong to two NUMA nodes (NUMA node A and NUMA node B), wherein two cores may serve as receiving cores, and the remaining cores except a control core may be forwarding cores. The two receiving cores may belong to the NUMA node A, one part of the forwarding cores may belong to the NUMA node A, and the other part of the forwarding cores may belong to the NUMA node B. Since all forwarding cores are equal in function, packets received by the receiving cores may be forwarded to any one of the forwarding cores. For example, when a receiving core within the NUMA node A receives a packet from a NIC, the receiving core may store the packet in the local memory of the NUMA node A. When the packet is to be forwarded to a forwarding core in the NUMA node B, the forwarding core in the NUMA node B may take the packet away from the local memory of the NUMA node A instead of using the local memory of the NUMA node B, which may cause a problem of cross NUMA node access, namely the problem of cross-memory access, thereby reducing a forwarding efficiency. As the number of NUMA nodes increases, a probability of occurrence of the cross-memory access may correspondingly increase, which may severely reduce a throughput performance of an NFV device.

To reduce the occurrence of the cross-memory access as much as possible and improve the forwarding efficiency, examples of the present disclosure may provide a method of forwarding a packet. According to the method, in a process of forwarding a packet, a receiving core and a forwarding core may be restricted to be within a NUMA node so that receiving and forwarding of the packet may be achieved by using a local memory. In the above example, if the packet received by the receiving core in the NUMA node A is to be sent to the forwarding core in the NUMA node A, the two cores may achieve packet forwarding by using the local memory. Based on this, according to the method for forwarding a packet of the present disclosure, roles of each core in a packet forwarding process may be reconfigured to achieve packet forwarding in the same NUMA node.

Initialization Configuration

The initialization configuration may include resetting operation of various NUMA nodes in the NFV device and various cores in the NUMA nodes, and the initialization configuration may be executed by a designated core in the NFV device. For example, all the cores in an NFV device may be uniformly numbered, and the core whose number is the minimum or the maximum may be taken as the designated core to execute the initialization configuration. In the process of the initialization configuration, the designated core may configure itself as a control core. For example, as shown in FIG. 1, two NUMA nodes may be illustrated, and each of the NUMA nodes may be connected through a QuickPath Interconnect (QPI) bus 20. Each NUMA node may have a local memory (a local memory 13 and a local memory 14). FIG. 1 shows 12 cores numbered from 0 to 11, wherein the core numbered as 0 may be supposed to be the control core.

The initialization configuration may include the following aspects.

Creation of a Forwarding Group

It is assumed that a NFV device of a NUMA mode may include a plurality of NUMA nodes, and each NUMA node may include a plurality of cores. A corresponding forwarding group may be created for each of the NUMA nodes when traversing the NUMA nodes, wherein the forwarding group may include all the cores in the NUMA node. These cores may be respectively configured as receiving cores or forwarding cores in a process of initialization of the forwarding group. After completion of the process of initialization of the forwarding group, a corresponding relationship among a receiving core, a forwarding core and the forwarding group may be formed. For example, the corresponding relationship may be indicated by a core role table that defines a role of each core and the corresponding relationship between the core and the forwarding group to which the core belongs. The core role table may be saved in a memory and called when a packet is to be forwarded. It is to be noted that the corresponding relationship among a receiving core, a forwarding core and the forwarding group may not be limited to the core role table, and any manner available for indicating the corresponding relationship may be acceptable.

Packet forwarding may be independently achieved by each forwarding group created through the above mentioned way, namely, packet forwarding may be implemented by means of cores within the forwarding group without intervention of any core in other forwarding groups (i.e., other NUMA nodes). Referring to FIG. 1, a forwarding group may be respectively created for the two NUMA nodes, namely a forwarding group 21 and a forwarding group 22.

Configuration of cores in a forwarding group may be as below.

To each forwarding group, all cores in the forwarding group may be traversed, and a role may be configured for each core, wherein the role may be a receiving core or a forwarding core. For example, a receiving core may be configured within each forwarding group, and the remaining cores within the forwarding group may be configured as forwarding cores. When there are many cores in a forwarding group, two or even more receiving cores may be configured so as to reduce stress in packet forwarding. The control core may belong to a forwarding group, for example, the forwarding group 21 may further include a control core.

The Role Setting of a Core in a Forwarding Group

For example, the designated core may configure itself as a control core.

In an example, in case that the forwarding group does not include the control core, at least one core in the forwarding group may be configured as a receiving core by the control core according to a predesigned rule, and the remaining cores may be configured as forwarding cores by the control core. For example, the control core may configure a core in the forwarding group whose number is the minimum or the maximum as the receiving core and configure the remaining cores as the forwarding cores. Referring to FIG. 1, if the forwarding group 22 does not include the control core, the control core may configure a core among six cores in the forwarding group 22 whose number is the minimum as the receiving core Data-Rx1, and configure the remaining cores as the forwarding cores, namely in total five forwarding cores from Data-Fwd4 to Data-Fwd8.

In case that the forwarding group includes the control core, the control core may configure at least one core in the forwarding group except the control core itself as the receiving core according to the predesigned rule, and configure the remaining cores as the forwarding cores. Supposing a first NUMA node includes the control core, a core among all the cores except the control core in the forwarding group whose number is the minimum or the maximum may be configured as the receiving core, and the remaining cores except the control core and the receiving core may be configured as the forwarding cores. Referring to FIG. 1, among the six cores in the forwarding group 21, a core whose number is the minimum may be the control core; among the remaining five cores, a core whose number is the minimum may be configured as the receiving core Data-Rx0; and the remaining four cores may be configured as the forwarding cores from Data-Fwd0 to Data-Fwd3.

Through the above configuration, the forwarding group 21 may include a control core, a receiving core Data-Rx0 and four forwarding cores from Data-Fwd0 to Data-Fwd3. The forwarding group 22 may include a receiving core Data-Rx1 and five forwarding cores from Data-Fwd4 to Data-Fwd8. As can be seen, in this example, each forwarding group may include a receiving core and forwarding cores. Thus, after receiving a packet, a receiving core may merely send the packet to a forwarding core in a forwarding group to which the receiving core belongs for processing.

Take an NFV device including four NUMA nodes as an example, wherein the number of cores in each NUMA node is six. Table 1 illustrates NUMA resource distribution of the device.

TABLE 1

NUMA Resource Distribution

| | | | | | | |
|---|---|---|---|---|---|---|
| NUMA-NODE 1 | Core0 | Core1 | Core2 | Core3 | Core4 | Core5 |
| NUMA-NODE 2 | Core6 | Core7 | Core8 | Core9 | Core10 | Core11 |
| NUMA-NODE 3 | Core12 | Core13 | Core14 | Core15 | Core16 | Core17 |
| NUMA-NODE 4 | Core18 | Core19 | Core20 | Core21 | Core22 | Core23 |

Correspondingly, a forwarding group may be created for each NUMA node of the NFV device, and cores in each forwarding group may be configured. As shown in Table 2, there are four forwarding groups, and each forwarding group may have a receiving core.

TABLE 2

Creation of Forwarding Groups

| | | | | | | |
|---|---|---|---|---|---|---|
| Forwarding Group 0 | Control | Data-Rx0 | Data-Fwd0 | Data-Fwd | Data-Fwd2 | Data-Fwd3 |
| Forwarding Group 1 | Data-Rx1 | Data-Fwd4 | Data-Fwd5 | Data-Fwd6 | Data-Fwd7 | Data-Fwd8 |
| Forwarding Group 2 | Data-Rx2 | Data-Fwd9 | Data-Fwd10 | Data-Fwd11 | Data-Fwd12 | Data-Fwd13 |
| Forwarding Group 3 | Data-Rx3 | Data-Fwd14 | Data-Fwd15 | Data-Fwd16 | Data-Fwd17 | Data-Fwd18 |

Setting of an Ingress Interface Corresponding to a Forwarding Group

After the forwarding groups are created, a corresponding ingress interface may be configured for each of the forwarding groups, and the forwarding group may forward a packet received through the ingress interface.

In an example, a manner of allocating an interface for a forwarding group may be provided. For example, a NIC generally may be associated with a certain socket, which may correspond to one NUMA node. Therefore, a NUMA node associated with a NIC may be identified, and an interface of the NIC may be allocated to the forwarding group of the NUMA node. If an interface receives a packet, the receiving core in the forwarding group corresponding to the interface may read the packet from the interface, and the interface may be referred to as an ingress interface.

Taking FIG. 1 as an example, eight NICs from NIC1 to NIC8 may be disposed around the forwarding group 21 and the forwarding group 22. An interface of the NIC2 may be allocated to the forwarding group 21, and the receiving core Data-Rx0 in the forwarding group 21 may read, from the interface, a packet received by the NIC2 for forwarding. An interface of the NIC3 may be allocated to the forwarding group 22, and the receiving core Data-Rx1 in the forwarding group 22 may read, from the interface, a packet received by the NIC3 for forwarding. This manner of allocating an interface may ensure a transmission distance between a NIC and a forwarding group to be shorter and reduce loss.

In an example, another manner of allocating an interface for a forwarding group may be provided. An interface configuration command may be inputted by means of a command line, and an interface of an NIC may be designated to be allocated to a forwarding group corresponding to a NUMA node according to the command. This manner may be advantageous to dynamically adjusting a corresponding relationship between a NIC interface and a forwarding group. For example, when a forwarding group bears a larger traffic and a heavier load, a part of interfaces corresponding to the forwarding group may be allocated to other forwarding groups. Namely, part of interfaces corresponding to a forwarding group may be deleted through the interface configuration command, simultaneously the deleted part of interfaces may be allocated to other forwarding groups, and a new corresponding relationship between interfaces and forwarding groups may be established.

The corresponding relationship between forwarding groups and interfaces may be recorded in a memory when the control core allocates corresponding interfaces to forwarding groups. When packet forwarding is to be performed subsequently, a receiving core may read packets received by NICs through these interfaces defined by the stored corresponding relationship.

Through the above initialization configuration, a corresponding forwarding group has been created for each NUMA node in the NFV device, roles of cores of each forwarding group may be set, and a corresponding ingress interface may be configured for each forwarding group. Then, each forwarding group in the NFV device may perform packet forwarding. Each forwarding group may independently execute packet forwarding, thereby reducing cross-memory access as much as possible and improving the throughput performance of the NFV device in packet forwarding.

Figure 2:
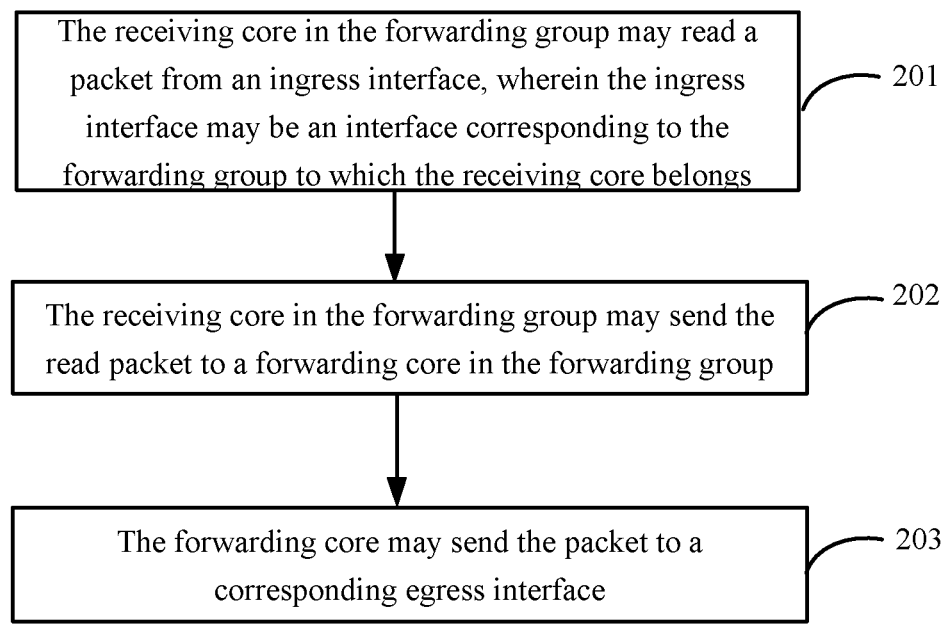
FIG. 2 is a flowchart of a method for forwarding a packet according to an example of the present disclosure.

With reference to FIG. 2, a method for forwarding a packet may be described according to the examples of the present disclosure, and the method for forwarding a packet may include following blocks.

At block 201, a receiving core in a forwarding group may read a packet from an ingress interface, which may be an interface corresponding to the forwarding group to which the receiving core belongs.

Taking the forwarding group 21 as an example, with reference to packet forwarding paths indicated by arrow lines as shown in FIG. 1, the receiving core Data-Rx0 in the forwarding group 21 may read a packet through the interface of the NIC2.

In this example, the number of ingress interfaces corresponding to one forwarding group may be multiple, for example, three or eight, etc. The receiving core in the forwarding group may traverse all ingress interfaces corresponding to the forwarding group, and a packet may be read when the packet is received by one of the ingress interfaces.

At block 202, the receiving core in the forwarding group may send the read packet to a forwarding core in the forwarding group.

In the present disclosure, the forwarding core may be selected from a forwarding group to which the receiving core belongs. The receiving core that reads the packet at block 201 may determine, by searching the corresponding relationship among the receiving core, the forwarding core and the forwarding group recorded in a memory, forwarding cores in the forwarding group to which the receiving core belongs. Then a forwarding core may be selected from the determined forwarding cores for packet forwarding. For example, after reading a packet, the receiving core Data-Rx0 in the forwarding group 21 may send the packet to the forwarding core Data-Fwd2. There are two manners which may be used to select a forwarding core from the forwarding group. One manner is stream-by-stream selection, that is, the receiving core may send a fixed quintuple packet to a fixed forwarding core in the forwarding group. The other manner is packet-by-packet selection, that is, forwarding cores in the forwarding group may be traversed for packet forwarding. For example, a packet 1 may be sent to a forwarding core 1, a packet 2 may be sent to a forwarding core 2, a packet 3 may be sent to a forwarding core 3, a packet 4 may be sent to a forwarding core 4, a packet 5 may be sent to the forwarding core 1, and a packet 6 may be sent to the forwarding core 2 and so on. The packet-by-packet selection may adopt this round-robin manner. Of course, manners for selecting a forwarding core may not be limited to the above two manners, the forwarding core may be selected according to other strategies, for example, according to a priority of the forwarding core and so on.

At block 203, the forwarding core may send the packet to a corresponding egress interface.

After receiving the packet, the forwarding core may continue forwarding the packet according to a forwarding rule (for example, selecting a corresponding egress interface according to a destination address of the packet) and send the packet out from the egress interface. As shown in FIG. 1, after receiving the packet sent by the Data-Rx0, the Data-Fwd2 may forward the packet to the NIC8.

Taking the forwarding group 22 as an example, the forwarding group 22 may likewise forward a packet according to the forwarding manner as shown from block 201 to block 203. As shown in FIG. 1, the receiving core Data-Rx1 may read a packet received by the NIC3, and then send the packet to the forwarding core Data-Fwd7 which is within the forwarding group 22 together with the Data-Rx1, and then the Data-Fwd7 may send the packet out from the NIC6.

To the NFV device adopting a NUMA system architecture, processor resources of the device may be divided into multiple efficient and relatively independent forwarding groups, thereby avoiding loss caused by across different NUMA nodes and greatly improving the overall throughput of the system. In addition, a forwarding group in the examples of the present disclosure may be a virtual machine or an NFV product having a bare metal form.

Figure 3:
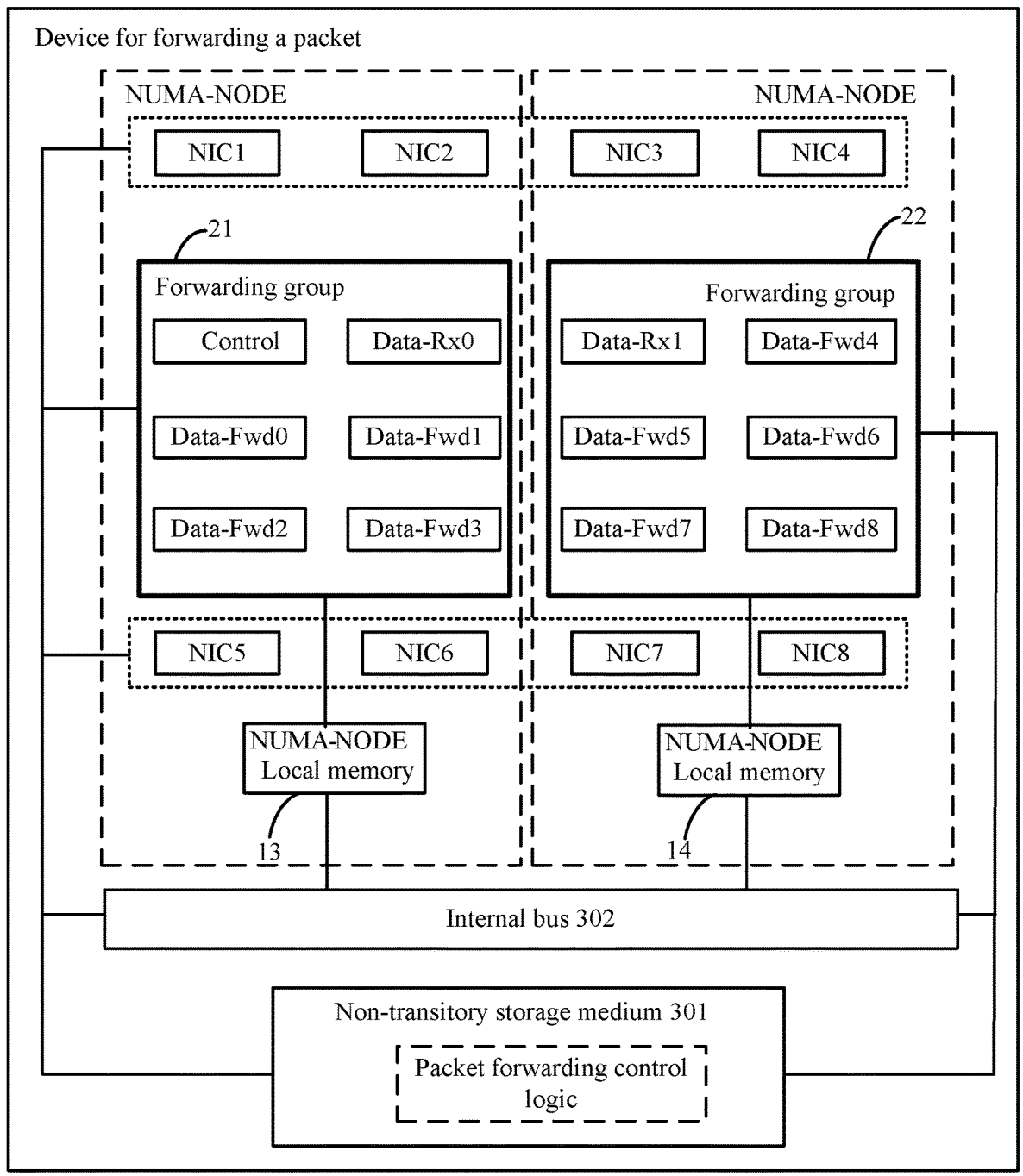
FIG. 3 is a hardware structure diagram of a device for forwarding a packet according to an example of the present disclosure.

The present disclosure further provides a device for forwarding a packet, which may have a hardware structure as shown in FIG. 3. Compared with FIG. 1, FIG. 3 may more clearly illustrate a connecting relationship among various hardware modules in the device for forwarding a packet. As shown in FIG. 3, in addition to a receiving core and a forwarding core, the device for forwarding a packet may further include a non-transitory storage medium 301 stored with machine readable instructions for packet forwarding control logic. Various parts as shown in FIG. 3 may intercommunicate through an internal bus 302. A plurality of cores belonging to the same forwarding group may correspond to one NUMA node. The receiving core and the forwarding core may execute the machine readable instructions to implement following operations. The receiving core may read a packet from an ingress interface, wherein the ingress interface is an interface corresponding to a forwarding group to which the receiving core belongs. The receiving core may send the read packet to a forwarding core in the forwarding group; and the forwarding core may send the packet to a corresponding egress interface.

The device for forwarding a packet may perform an initialization configuration through a control core, create a corresponding forwarding group for each NUMA node in the device for forwarding a packet and configure each core in the forwarding group as a receiving core, a forwarding core or a control core. The device for forwarding a packet may also allocate a corresponding interface for each forwarding group so that the receiving core in the forwarding group may read a packet from the interface.

After completion of the initialization configuration, a plurality of independent forwarding groups may be formed in the device for forwarding a packet to independently execute packet forwarding. When a packet is to be forwarded, each forwarding group may forward the packet according to the method for forwarding a packet of the present disclosure. For example, when receiving a packet, the receiving core may send the packet to a forwarding core of the same forwarding group, thereby reducing crossmemory access as much as possible and improving the throughput performance of the device for forwarding a packet in packet forwarding.

Terms used in the present disclosure are only for the purpose of description of specific examples, and are not intended to limit the present disclosure. As used in the present disclosure and claims, the singular forms "a/an", "said" and "the" intend to also include the plural form, unless the content clearly dictates otherwise. It should also be understood that the term "and/or" used herein means to include arbitrary and all possible combinations of one or more items listed in association.

The examples set forth above are merely some but not all of the examples of the present disclosure. All other examples obtained by persons of ordinary skill in the art based on the examples of the present disclosure without creative efforts shall fall within the protection scope of the present disclosure.

The examples set forth above are only illustrated as preferred examples of the present disclosure, and are not intended to limit the present disclosure. All modifications, equivalent substitutions and improvements made within the spirit and principles of the present disclosure shall fall within the protection scope of the present disclosure.

What is claimed is:

1. A method for forwarding a packet, applicable to each non-uniform memory architecture (NUMA) node included in a network function virtualization (NFV) device, wherein the each NUMA node comprises a forwarding group comprising a receiving core and a forwarding core, at least one core of a plurality of cores included in the each NUMA node and at least one core of the other cores of the plurality of cores being configured as a receiving core and a forwarding core of the forwarding group of the each NUMA node respectively, and the method comprises:
    creating, by a designated core in the NFV device, the forwarding group for the NUMA node, wherein the forwarding group comprises all cores of the NUMA node;
    configuring, by the designated core, the cores in the forwarding group as a control core, a receiving core or a forwarding core;
    configuring, by the designated core, a corresponding ingress interface for the forwarding group;
    reading, by a receiving core of the each NUMA node, a packet from an ingress interface, wherein the ingress interface is an interface corresponding to a forwarding group to which the receiving core of the each NUMA node belongs;
    sending, by the receiving core of the each NUMA node, the packet read by itself to a forwarding core in the forwarding group to which the receiving core of the each NUMA node belongs; and
    sending, by the forwarding core in the forwarding group to which the receiving core of the each NUMA node belongs, the packet sent by the receiving core of the each NUMA node to a corresponding egress interface.

2. The method according to claim 1, wherein configuring the cores in the forwarding group as a control core, a receiving core or a forwarding core comprises:
    configuring, by the designated core, the core itself as a control core;
    in case that the forwarding group does not comprise the control core,
    configuring, by the control core, at least one core in the forwarding group as the receiving core according to a predesigned rule, and
    configuring, by the control core, the remaining cores in the forwarding group as the forwarding cores; and
    in case that the forwarding group comprises the control core,
    configuring, by the control core, at least one core in the forwarding group except the control core itself as the receiving core according to the predesigned rule, and
    configuring, by the control core, the remaining cores in the forwarding group as the forwarding cores.

3. The method according to claim 2, wherein sending the read packet to a forwarding core in the forwarding group comprises:
    acquiring, by the receiving core, a corresponding relationship among a receiving core, a forwarding core and a forwarding group;
    determining, by the receiving core, a forwarding core in the forwarding group according to the corresponding relationship; and
    sending, by the receiving core, the read packet to the determined forwarding core.

4. The method according to claim 2, wherein configuring a corresponding ingress interface for the forwarding group comprises:
    identifying, by the control core, a network interface card associated with the NUMA node, and
    allocating, by the control core, an interface of the network interface card as the ingress interface, to the forwarding group of the NUMA node.

5. The method according to claim 2, wherein configuring a corresponding ingress interface for the forwarding group comprises:
  allocating, by the control core, a specified interface to the forwarding group as the ingress interface according to an interface configuration command.

6. A device for forwarding a packet, comprising:
  a receiving core;
  a forwarding core;
  a control core which is a designated core of the device for forwarding a packet; and
  a non-transitory machine readable storage medium storing machine readable instructions,
  wherein the receiving core and the forwarding core which belong to a same forwarding group included in each non-uniform memory architecture (NUMA) node, the each NUMA node comprising a plurality of cores, at least one core of the plurality of cores included in the each NUMA node and at least one core of the other cores of the plurality of cores being configured as a receiving core and a forwarding core of the forwarding group of the each NUMA node respectively,
  the machine readable instructions cause the control core to:
  create the forwarding group for the NUMA node, wherein the forwarding group comprises all cores of the NUMA node;
  configure the cores in the forwarding group as a control core, a receiving core or a forwarding core; and
  configure a corresponding ingress interface for the forwarding group,
  the machine readable instructions are executable by the receiving core of the each NUMA node to:
  read a packet from an ingress interface, wherein the ingress interface is an interface corresponding to a forwarding group to which the receiving core of the each NUMA node belongs;
  send the read packet to a forwarding core in the forwarding group to which the receiving core of the each NUMA node belongs; and
  the machine readable instructions are executable by the forwarding core in the forwarding group to which the receiving core of the each NUMA node belongs to:
  send the packet sent by the receiving core of the each NUMA node to a corresponding egress interface.

7. The device according to claim 6, wherein when configuring the cores in the forwarding group as a control core, a receiving core or a forwarding core, the machine readable instructions further cause the control core to:
  configure itself as a control core;
  in case that the forwarding group does not comprise the control core,
  configure at least one core in the forwarding group as the receiving core according to a predesigned rule, and
  configure the remaining cores in the forwarding group as the forwarding cores; and
  in case that the forwarding group comprises the control core,
  configure at least one core in the forwarding group except the control core itself as the receiving core according to the predesigned rule, and
  configure the remaining cores in the forwarding group as the forwarding cores.

8. The device according to claim 7, wherein when sending the read packet to a forwarding core in the forwarding group, the machine readable instructions further cause the receiving core to:
  acquire a corresponding relationship among a receiving core, a forwarding core and a forwarding group;
  determine a forwarding core in the forwarding group according to the corresponding relationship; and
  send the read packet to the determined forwarding core.

9. The device according to claim 7, wherein when configuring a corresponding ingress interface for the forwarding group, the machine readable instructions further cause the control core to:
  identify a network interface card associated with the NUMA node, and
  allocate an interface of the network interface card as the ingress interface, to the forwarding group of the NUMA node.

10. The device according to claim 7, wherein when configuring a corresponding ingress interface for the forwarding group, the machine readable instructions further cause the control core to:
  allocate a specified interface to the forwarding group as the ingress interface according to an interface configuration command.

* * * * *